(12) United States Patent
Chan

(10) Patent No.: US 12,024,878 B2
(45) Date of Patent: Jul. 2, 2024

(54) WATERPROOFING MEMBRANE SYSTEM AND METHOD

(71) Applicant: OceanLink USA, Inc., Lodi, NJ (US)

(72) Inventor: Rizal S. Chan, Alpine, NJ (US)

(73) Assignee: OCEANLINK USA, INC., Lodi, NJ (US)

( * ) Notice: Subject to any disclaimer, the term of this patent is extended or adjusted under 35 U.S.C. 154(b) by 279 days.

(21) Appl. No.: 16/213,786

(22) Filed: Dec. 7, 2018

(65) Prior Publication Data

US 2020/0048896 A1    Feb. 13, 2020

Related U.S. Application Data

(60) Provisional application No. 62/717,314, filed on Aug. 10, 2018.

(51) Int. Cl.
*E04B 1/66* (2006.01)
*B32B 7/12* (2006.01)
(Continued)

(52) U.S. Cl.
CPC ............... *E04B 1/665* (2013.01); *B32B 7/12* (2013.01); *B32B 27/12* (2013.01); *B32B 27/32* (2013.01);
(Continued)

(58) Field of Classification Search
None
See application file for complete search history.

(56) References Cited

U.S. PATENT DOCUMENTS 1,524,090 A * 1/1925 Dozier .................... E04D 5/142
427/418
3,741,856 A 6/1973 Hurst
(Continued)

FOREIGN PATENT DOCUMENTS

CN    1050376 C    3/2000
CN    1268431 A    10/2000
(Continued)

OTHER PUBLICATIONS

Machine translation of WO 2013117428 A1 (Year: 2013).*

*Primary Examiner* — Frank D Ducheneaux
(74) *Attorney, Agent, or Firm* — MANNAVA & KANG, PC; George Y. Wang

(57) ABSTRACT

A waterproofing membrane system for waterproofing a concrete substrate is disclosed. The waterproofing membrane may comprise a first layer comprising a thermoplastic elastomeric waterproof material using advanced polymerization and squeeze technology. The second layer may comprise a carrier sheet that comprises a fabric. The third layer may comprise an adhesive to provide bonding of the first layer with a concrete substrate upon contact. In addition, the third layer may reduce migration of water and vapor traveling between the first layer and the concrete substrate. In some examples, the waterproofing membrane may also comprise a fourth layer to provide mechanical protection and ease of handling for the first layer, the second layer, and the third layer. In some examples, the first layer may comprise a thermoplastic polyolefin (TPO), the fabric may comprise polypropylene and/or polyethylene, the adhesive may comprise a C5 petroleum resin, and the fourth layer may be a protective coating comprising quartz sand (SiO2) having a reflectivity of 4.5%.

11 Claims, 3 Drawing Sheets

(51) Int. Cl.
*B32B 27/12* (2006.01)
*B32B 27/32* (2006.01)
*C08K 3/36* (2006.01)
*C09J 7/24* (2018.01)
*C09J 7/29* (2018.01)
*C09J 7/40* (2018.01)
*C09J 193/00* (2006.01)

(52) U.S. Cl.
CPC .............. *C08K 3/36* (2013.01); *C09J 7/241* (2018.01); *C09J 7/29* (2018.01); *C09J 7/401* (2018.01); *C09J 193/00* (2013.01); *B32B 2255/10* (2013.01); *B32B 2255/20* (2013.01); *B32B 2262/0253* (2013.01); *B32B 2307/554* (2013.01); *B32B 2307/712* (2013.01); *B32B 2307/7265* (2013.01); *C09J 2203/346* (2020.08); *C09J 2301/122* (2020.08); *C09J 2301/312* (2020.08); *C09J 2301/41* (2020.08); *C09J 2400/14* (2013.01); *C09J 2400/263* (2013.01); *C09J 2423/046* (2013.01); *C09J 2423/106* (2013.01); *C09J 2431/006* (2013.01)

(56) References Cited

U.S. PATENT DOCUMENTS

| | | |
|---|---|---|
| 3,853,682 A | 12/1974 | Hurst |
| 3,900,102 A | 8/1975 | Hurst |
| 4,215,160 A | 7/1980 | Rosenberg et al. |
| 4,386,981 A | 6/1983 | Clapperton |
| 4,396,665 A | 8/1983 | Rowe |
| 4,442,148 A | 4/1984 | Stierli |
| 4,595,636 A | 6/1986 | Wiercinski et al. |
| 4,600,635 A | 7/1986 | Wiercinski et al. |
| 5,316,848 A | 5/1994 | Bartlett et al. |
| 5,976,292 A * | 11/1999 | Barksdale ............ B24D 15/023 156/281 |
| 6,235,365 B1 | 5/2001 | Schaughency et al. |
| 6,500,520 B1 | 12/2002 | Wiercinski et al. |
| 6,898,917 B2 | 5/2005 | Durning et al. |
| 7,219,479 B2 | 5/2007 | Durning et al. |
| 7,459,180 B2 | 12/2008 | Hamdar et al. |
| 7,550,187 B2 | 6/2009 | Seth et al. |
| 7,968,171 B2 | 6/2011 | Seth et al. |
| 8,079,184 B2 | 12/2011 | Wiercinski et al. |
| 8,298,661 B2 | 10/2012 | Samanta et al. |
| 8,298,662 B2 | 10/2012 | Samanta et al. |
| 8,453,405 B2 | 6/2013 | Wiercinski et al. |
| 8,475,909 B2 | 7/2013 | Seth et al. |
| 8,609,213 B2 | 12/2013 | Wiercinski et al. |
| 8,713,879 B2 | 5/2014 | Wiercinski et al. |
| 8,931,229 B2 | 1/2015 | Wiercinski et al. |
| 9,394,464 B2 | 7/2016 | Wiercinski et al. |
| 9,476,196 B2 | 10/2016 | Wiercinski et al. |
| 2006/0240208 A1* | 10/2006 | Ishikawa ............ C09J 7/241 428/40.1 |
| 2007/0044397 A1 | 3/2007 | Wiercinski et al. |
| 2008/0193696 A1* | 8/2008 | Hayes .................. C09D 183/04 428/41.8 |
| 2010/0173110 A1 | 7/2010 | Wiercinski et al. |
| 2010/0173112 A1 | 7/2010 | Wiercinski |
| 2012/0180933 A1 | 7/2012 | Wiercinski et al. |
| 2015/0368904 A1* | 12/2015 | Humphreys .............. B32B 7/06 156/279 |
| 2016/0040440 A1 | 2/2016 | Wiercinski et al. |
| 2021/0171808 A1* | 6/2021 | Ackermann ............ B32B 27/22 |
| 2022/0203331 A1* | 6/2022 | Lindars ................ A61M 11/041 |

FOREIGN PATENT DOCUMENTS

| | | | |
|---|---|---|---|
| CN | 1064497 C | 4/2001 | |
| CN | 1165415 C | 9/2004 | |
| CN | 1268431 C | 8/2006 | |
| CN | 1863671 B | 1/2011 | |
| CN | 102015283 A | 4/2011 | |
| CN | 1960856 B | 2/2012 | |
| CN | 102196902 B | 11/2014 | |
| CN | 102725139 B | 7/2015 | |
| CN | 103625077 B | 10/2015 | |
| WO | WO-2013117428 A1 * | 8/2013 | ............ C09J 133/08 |

* cited by examiner

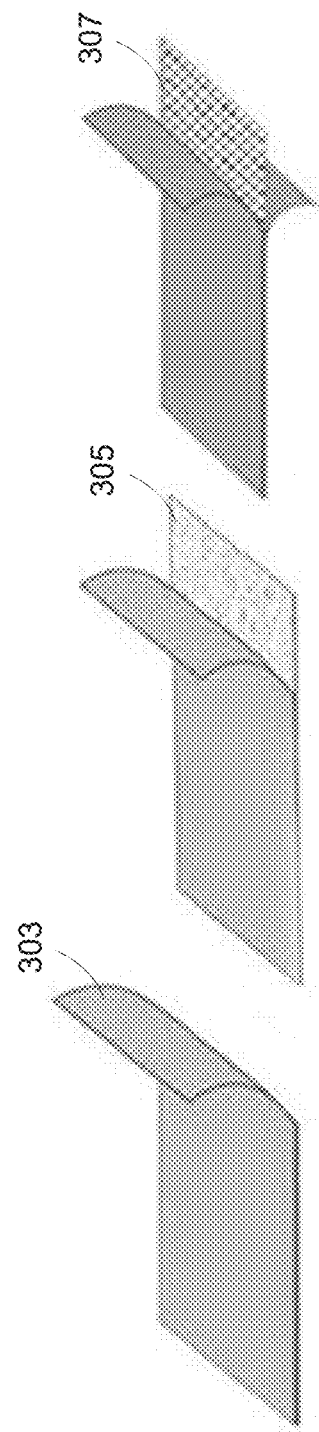

WATERPROOFING MEMBRANE SYSTEM AND METHOD

PRIORITY

This patent application claims priority to U.S. Provisional Patent Application 62/717,314, entitled "Waterproofing Membrane System and Method", filed on Aug. 10, 2018.

TECHNICAL FIELD

This patent application relates generally to a waterproofing membrane system and method, and more specifically, to systems and methods for waterproofing a concrete substrate and other related waterproofing applications.

BACKGROUND

Laminate sheets are typically used for waterproofing concrete. These laminate sheets, however, are normally applied to a concrete substrate that has already been formed, such as a building foundation. As a result, such laminate sheets are applied on a cured concrete surface. In other concrete applications, laminate sheets can also be applied to concrete that is freshly-poured, or on surfaces that are not yet cured.

Conventional laminate sheets offer limited waterproofing capabilities when applied to either cured or non-cured concrete substrates. The integrity of a waterproofing membrane system is generally based on materials, size, dimensions, and arrangement of various layers. In many cases, conventional laminate sheets do not form an adequate water barrier or are cumbersome to use and install, which also results in poor waterproofing. In addition, conventional laminate sheets lack durability in extreme weather conditions and typically cannot accommodate heavy foot traffic or other physical wear.

As a result, a more robust waterproofing membrane system and method may be imperative to overcome the shortcomings of conventional systems and methods.

BRIEF DESCRIPTION OF DRAWINGS

Features of the present disclosure are illustrated by way of example and not limited in the following Figure(s), in which like numerals indicate like elements, in which:

FIGS. 3A-3C illustrate cross-sections of various waterproofing membrane systems, according to an example.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, conventional laminate sheets offer limited waterproofing capabilities when applied to either cured or non-cured concrete substrates. They lack durability and cannot accommodate heavy physical wear or extreme conditions. Use and installation of conventional laminate sheets are also cumbersome. In many cases, conventional laminate sheets do not provide an adequate water barrier for which they are created.

Figure 1:
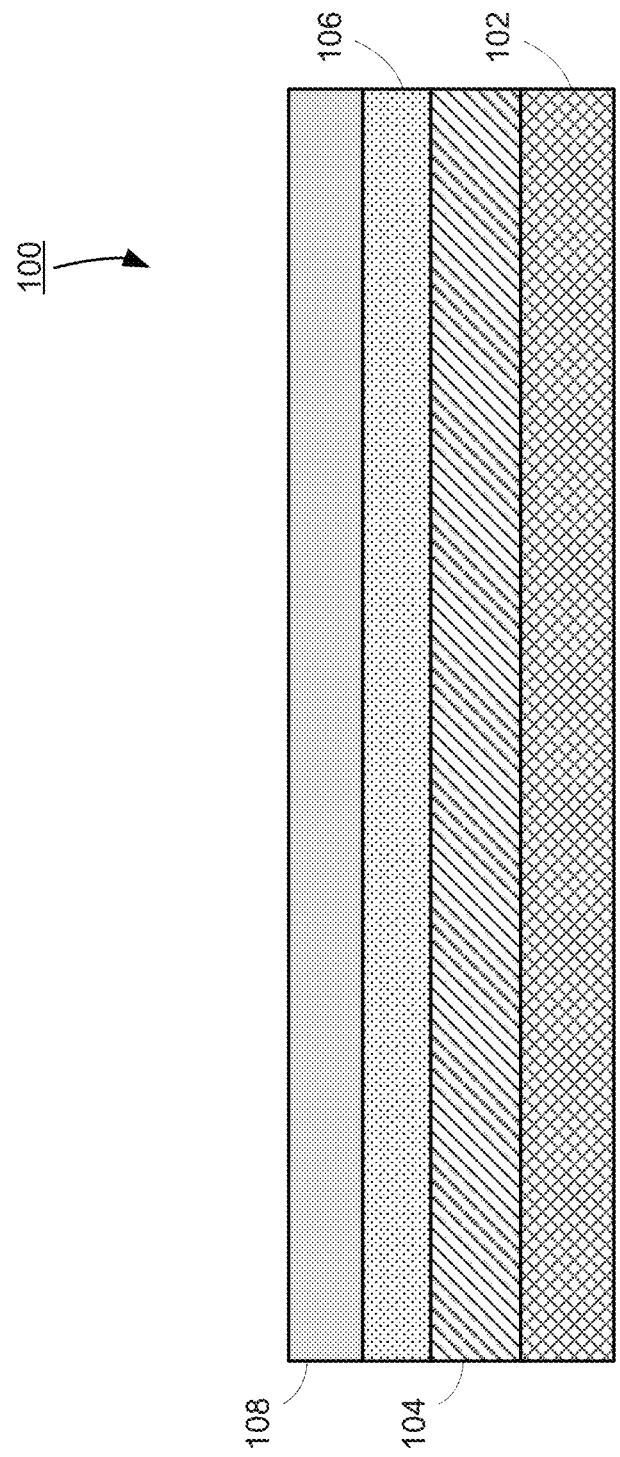
FIG. 1 illustrates a cross-section of a waterproofing membrane system, according to an example.

FIG. 1 illustrates a cross-section of a waterproofing membrane system 100, according to an example. As shown, the waterproofing system 100 may include various layers. For example, the waterproofing membrane system 100 may have a first layer 102, a second layer 104, a third layer 106, and a fourth layer 108.

The first layer 102 may be a membrane layer. The membrane layer may be made of a thermoplastic elastomeric waterproof material using advanced polymerization together with squeeze technology having high tensile strength and resistant to oxidation and puncture. For example, the membrane may include a thermoplastic polyolefin (TPO). In another example, the membrane may include other various materials, such as elastomer (POE) plastic, EVA plastic, plasticizer, antioxidant, etc.

The second layer 104 may be a carrier sheet. In an example, the carrier sheet may include a fabric made of polypropylene. In some examples, the carrier sheet may be made of 100% polypropylene. Alternatively, the carrier sheet may be made of a fabric that includes a mix of polypropylene and polyethylene.

The third layer 106 may be an adhesive layer. In an example, the adhesive layer may be made of C5 petroleum resin. The adhesive layer may provide bonding of the membrane and concrete upon contact, as well as reduce migration of water and vapor traveling between these two materials.

The fourth layer 108 may be a protective coating. In an example, the protective coating may be made of quartz sand (SiO2) or other similar material(s). In some examples, the protective coating may have a reflectivity of 4.5%. Depending on application or purpose, the reflectivity may be greater than, equal to, or lesser than 4.5%. The protective coating may also provide mechanical protection for the membrane, carrier sheet, and/or adhesive layer as well, so that the surface of the membrane or other layers, for example, may be more easily handled. This may be especially important in transportation, storage, and application the waterproofing membrane on a concrete substrate.

Figure 2:
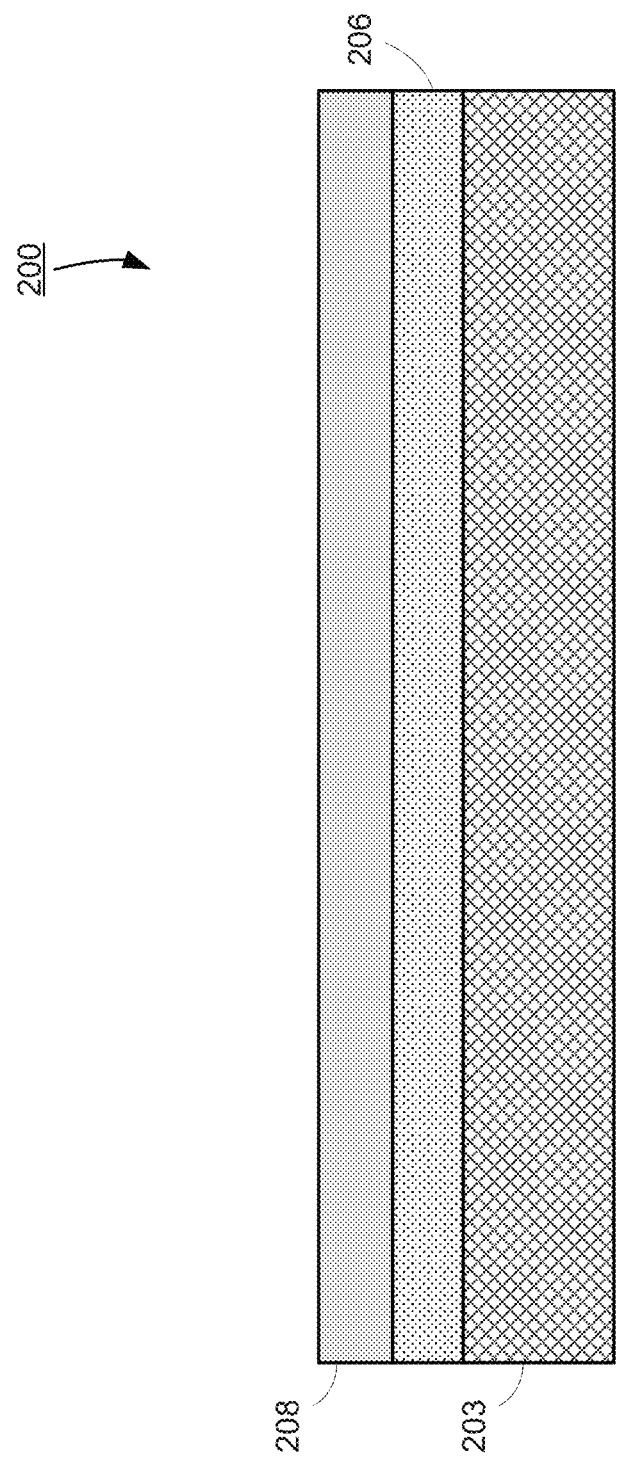
FIG. 2 illustrates a cross-section of a waterproofing membrane system, according to another example.

FIG. 2 illustrates a cross-section of a waterproofing membrane system 200, according to another example. As shown, the waterproofing membrane system 200 may be similar to waterproofing membrane system 100 of FIG. 1 and include various layers. In the waterproofing membrane system 200 of FIG. 2, however, there may be only three total layers. The waterproofing membrane system 200 may have a first layer 203, a second layer 206, and a third layer 208. The second layer 206 may be an adhesive layer similar to that of the third layer 106 of FIG. 1, and the third layer 208 may be a protective coating similar to that of the fourth layer 108 of FIG. 1. The first layer 203 may be a carrier sheet that incorporates a membrane-like features. In effect, the first layer 203 may be an integrated version of the first layer 102 and the second layer 104 of FIG. 1.

Other various examples or variations may also be provided. For example, the layers of FIGS. 1 and 2 may be interchangeable, substituted, and/or arranged in an order different than what is shown.

FIGS. 3A-3C illustrate cross-sections of various waterproofing membrane systems, according to an example. FIG. 3A may depict a waterproofing membrane system that includes a single sheet 303. Sheet 303 may be the waterproof membrane system 100 of FIG. 1 or the waterproof membrane system 200 of FIG. 2. Here, sheet 303 may be a homoegenous waterproofing membrane system that does not include any other layer or component. Advantages of a homogeneous waterproofing membrane system is its relatively lightweight nature, making it easier to transport, store, and install.

FIG. 3B may depict a waterproofing membrane system that includes sheet 303 and a backing sheet 305. In an example, the backing sheet 305 may be a woven or a non-woven material. The backing sheet 305 may help with strength, durability of the waterproofing membrane system, or may help with use and installation of the waterproofing membrane system. It may also help protect the waterproofing membrane during transportation, storage, and application. Other various advantages may be apparent.

FIG. 3C may depict a waterproofing membrane system that includes two sheets 303 with a reinforcement sheet 307 therebetween. In an example, reinforcement sheet 307 may be a woven or a non-woven material reinforcement sheet 307 may help with strength, durability of the waterproofing membrane system, or ay help with use and installation of the waterproofing membrane system. It may also help protect the waterproofing membrane during transportation, storage, and application. Other various advantages may be apparent.

In an example, the waterproofing membrane system and method may follow the specifications outlined below in TABLE 1.

TABLE 1

| ITEM | | INDEX | | |
|---|---|---|---|---|
| | | H | L (Fleece back) | P |
| The resin thickness of Middle fabric, mm ≥ | | — | | |
| Maximum tension, N/cm ≥ | | — | 200 | 250 |
| Tension strength, Mpa ≥ | | 12 | — | — |
| Maximum tension elongation, % ≥ | | — | — | 15 |
| Fracture elongation, % ≥ | | 500 | 250 | — |
| Heat treatment size change rate % ≤ | | 2 | 1 | 0.5 |
| Low temperature bend | | −40° C. No crack | | |
| Water tightness | | 0.3 Mpa, 2 h, No seepage | | |
| Attack resistance | | 0.5 kg m, No seepage | | |
| Static charge resistance | | — | — | 20 kg, No seepage |
| Seam strip strength, N/mm ≥ | | 4.0 or Membranes break | 3.0 | |
| Right-angle tear strength, N/mm ≥ | | 60 | — | — |
| Trapezoid tear strength N ≥ | | — | 250 | 450 |
| Bibulous rate (70° C. 168 h), % | After soaking ≤ | | 4.0 | |
| | Air-cure later ≥ | | −0.4 | |
| Heat aging (115° C.) | Time | | 672 h | |
| | Appearance | | No blister, flaw, delamination, coherence, hole | |
| | Tensile strength retention, % ≥ | — | 90 | 90 |
| | Elongation rate of keeping, % ≥ | 90 | — | — |
| | Low-temperature bend | | −40° C., No crack | |
| Chemistry | Appearance | | No blister, flaw, delamination, coherence, hole | |
| | Tensile strength retention, % ≥ | — | 90 | 90 |
| | Elongation rate of keeping, % ≥ | 90 | — | — |
| | Low-temperature bending | | −40° C., No crack | |
| Artificial weather accelerated aging | Time | | 1500 h | |
| | Appearance | | No blister, flaw, delamination, coherence, hole | |
| | Tensile strength retention % ≥ | — | 90 | 90 |
| | Elongation rate of keeping % ≥ | 90 | — | — |
| | Low temperature bend | | −40° C., No crack | |

In another example, the waterproofing membrane system and method may follow the specifications outlined below in TABLE 2 and TABLE 3.

TABLE 2

| Dimensions (Nominal) | TPO Waterproofing Membrane System |
|---|---|
| Thickness | 0.046 in. (1.2 mm) |
| Roll size | 6 ft. 6 in. × 65 ft. 7 in. (2 m × 20 m) |
| Roll area | 430 ft² (40 m²) |
| Roll weight | 132 lbs (60 kg) |
| Minimum side/end laps | 3 in. (75 mm) |

TABLE 3

| Property | TPO Waterproofing Membrane System |
|---|---|
| Color | White |
| Thickness | 0.046 in. (1.2 mm) |
| Lateral water migration resistance | Pass at 180 ft (55 m) |
| Low temperature flexibility | −40° C. no leaking |
| Resistance to hydrostatic head | 180 ft (55 m) |
| Elongation | 612% |
| Tensile strength, film | 2262 psi (15.6 MPa) |
| Crack cyclin at −9.4° F. (−23° C.), 100 cycles | Unaffected, Pass |
| Puncture resistance | 184 lbs (820 N) |
| Peel adhesion to concrete | 4 lbs/in. (700 N/m) |
| Lap peel adhesian at 72° F. (22° C.) | 6.85 lbs/in. (120 N/m) |
| Lap peel adhesian at 40° F. (4° C.) | 5 lbs/in. (900 N/m) |
| Permeance to water vapor transmission | 0/35 MPa × 2 h = 0.7 ng |

Furthermore, in some examples, weathering between −40° C. through 110° C. may not affect the waterproofing membrane system. The waterproofing membrane system may be environmentally friendly as well, and may not include chlorine and other hazardous materials. The waterproofing membrane system may also be extremely durable and have an effective life of up to 50 years. The waterproofing membrane system may include crack resistance. This waterproofing membrane system may be suitable for the construction of exposed or non-exposed roof waterproof layer. It may also be easy to shape along any surface area to provide waterproofing. In additional to concrete application, the waterproofing membrane system described herein may also be used on light steel roof, not only to reduce the weight of roofing, and excellent saving materials, waterproof and anti-condensation, suit for large industrial plants, public buildings. Other various waterproofing applications may be provided as well, such as for drinking water reservoirs, toilets, basements, tunnels, grain depots, subways, reservoirs, commercial, public, residential applications, etc.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A unitary waterproofing membrane system, comprising:
a first waterproof membrane sheet;
a second waterproof membrane sheet; and
a reinforcement sheet between the first waterproof membrane sheet and the second waterproof membrane sheet to secure the first waterproof membrane sheet to the second waterproof membrane sheet, wherein the first waterproof membrane sheet is positioned on top of the reinforcement sheet, and the second waterproof membrane sheet is positioned under the reinforcement sheet, and all of edges of the reinforcement sheet, the first waterproof membrane sheet, and the second waterproof membrane sheet are coincident with each other,
wherein each of the first and second waterproof membrane sheets comprises:
a first layer comprising a thermoplastic elastomeric waterproof material;
a second layer comprising a carrier sheet, wherein the second layer is disposed on the first layer;
a third layer comprising an adhesive, wherein the third layer is disposed on the second layer; and
a fourth layer comprising a protective coating, wherein the fourth layer is disposed on the third layer, and
wherein the protective coating of the fourth layer of each of the first and second waterproof membrane sheets comprises quartz sand ($SiO_2$).

2. The waterproofing membrane system of claim 1, wherein the thermoplastic elastomeric waterproof material of the first layer of each of the first and second waterproof membrane sheets comprises thermoplastic polyolefin (TPO).

3. The waterproofing membrane system of claim 1, wherein the thermoplastic elastomeric waterproof material of the first layer of each of the first and second waterproof membrane sheets comprises at least one of an elastomer (POE) plastic, a EVA plastic, and a plasticizer.

4. The waterproofing membrane system of claim 1, wherein the carrier sheet of the second layer of each of the first and second waterproof membrane sheets is made of one of polypropylene and polyethylene.

5. The waterproofing membrane system of claim 1, wherein the adhesive of the third layer of each of the first and second waterproof membrane sheets is made of C5 petroleum resin.

6. The waterproofing membrane system of claim 1, wherein the waterproofing membrane system withstands weather temperatures between −40° C. and 110° C.

7. A unitary waterproofing membrane system, comprising:
a first waterproof membrane sheet;
a second waterproof membrane sheet; and
a reinforcement sheet between the first waterproof membrane sheet and the second waterproof membrane sheet to secure the first waterproof membrane sheet to the second waterproof membrane sheet, wherein the first waterproof membrane sheet is positioned on top of the reinforcement sheet, and the second waterproof membrane sheet is positioned under the reinforcement sheet, and all of edges of the reinforcement sheet, the first waterproof membrane sheet, and the second waterproof membrane sheet are coincident with each other,
wherein each of the first and second waterproof membrane sheets comprises:
a membrane layer;
a carrier sheet disposed on the membrane layer;
an adhesive layer disposed on the carrier sheet; and
a protective coating disposed on the adhesive layer, and
wherein the reinforcement sheet comprises at least one of a woven and non-woven material to provide mechanical strength and durability to the first and second waterproof membrane sheets, and wherein the protective coating of each of the first and second waterproof membrane sheets comprises quartz sand ($SiO_2$).

8. The waterproofing membrane system of claim 7, wherein the membrane layer of each of the first and second waterproof membrane sheets comprises at least one of a thermoplastic polyolefin (TPO), an elastomer (POE) plastic, a EVA plastic, and a plasticizer.

9. The waterproofing membrane system of claim 7, wherein the carrier sheet of each of the first and second waterproof membrane sheets comprises at least one of polypropylene and polyethylene.

10. The waterproofing membrane system of claim 7, wherein the adhesive layer of each of the first and second waterproof membrane sheets comprises C5 petroleum resin.

11. The waterproofing membrane system of claim 7, wherein the waterproofing membrane system withstands weather temperatures between −40° C. and 110° C.

\* \* \* \* \*